UNITED STATES PATENT OFFICE.

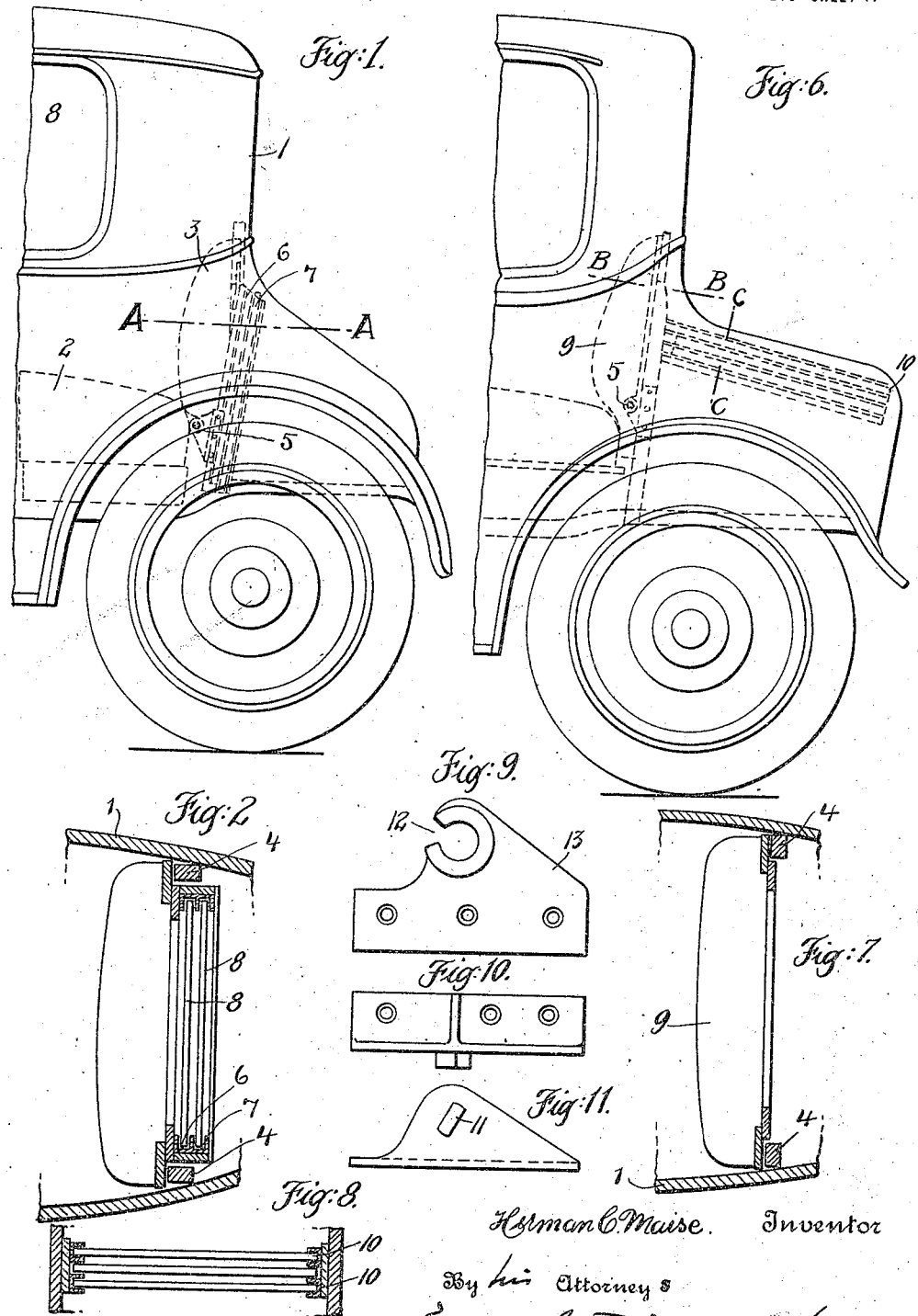

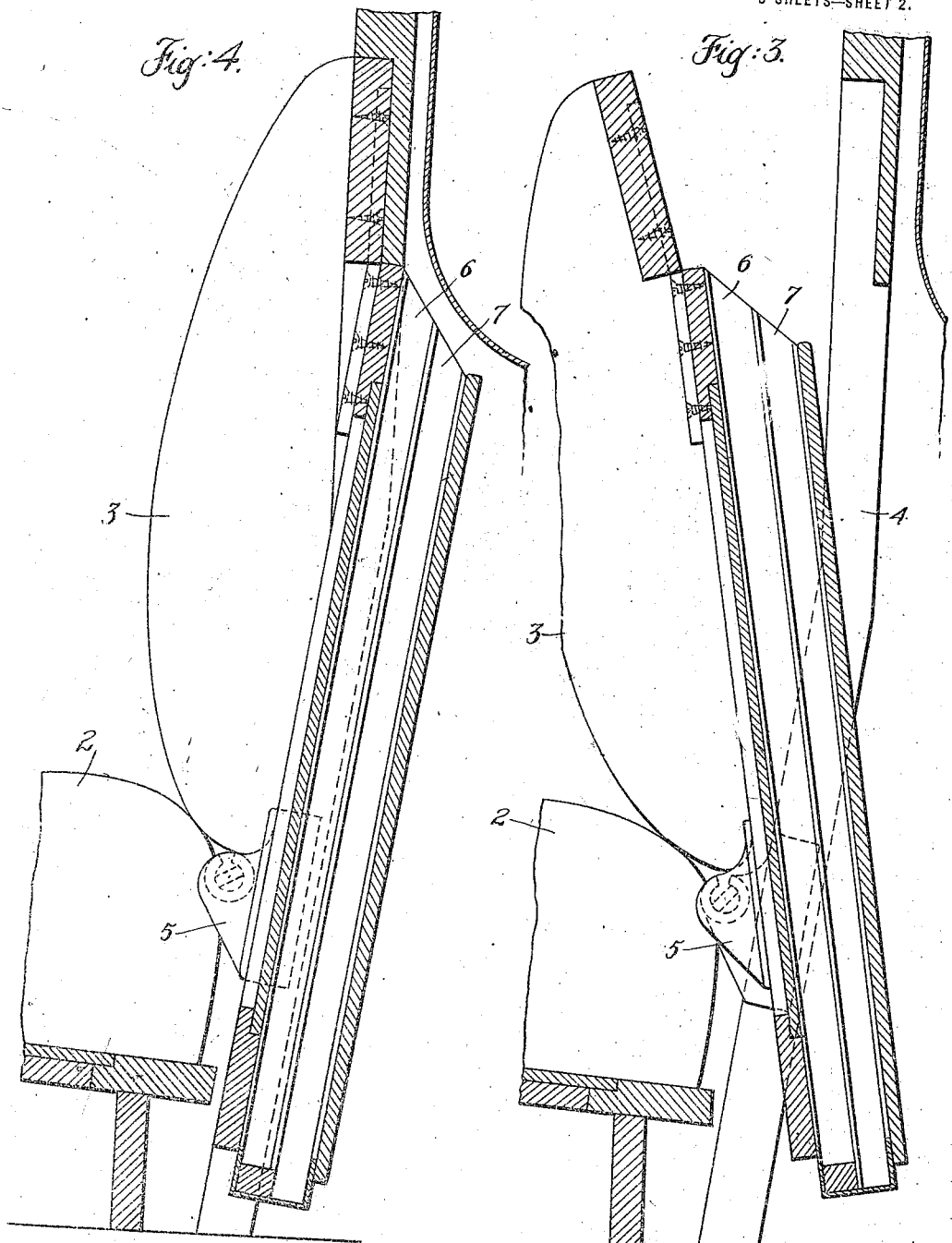

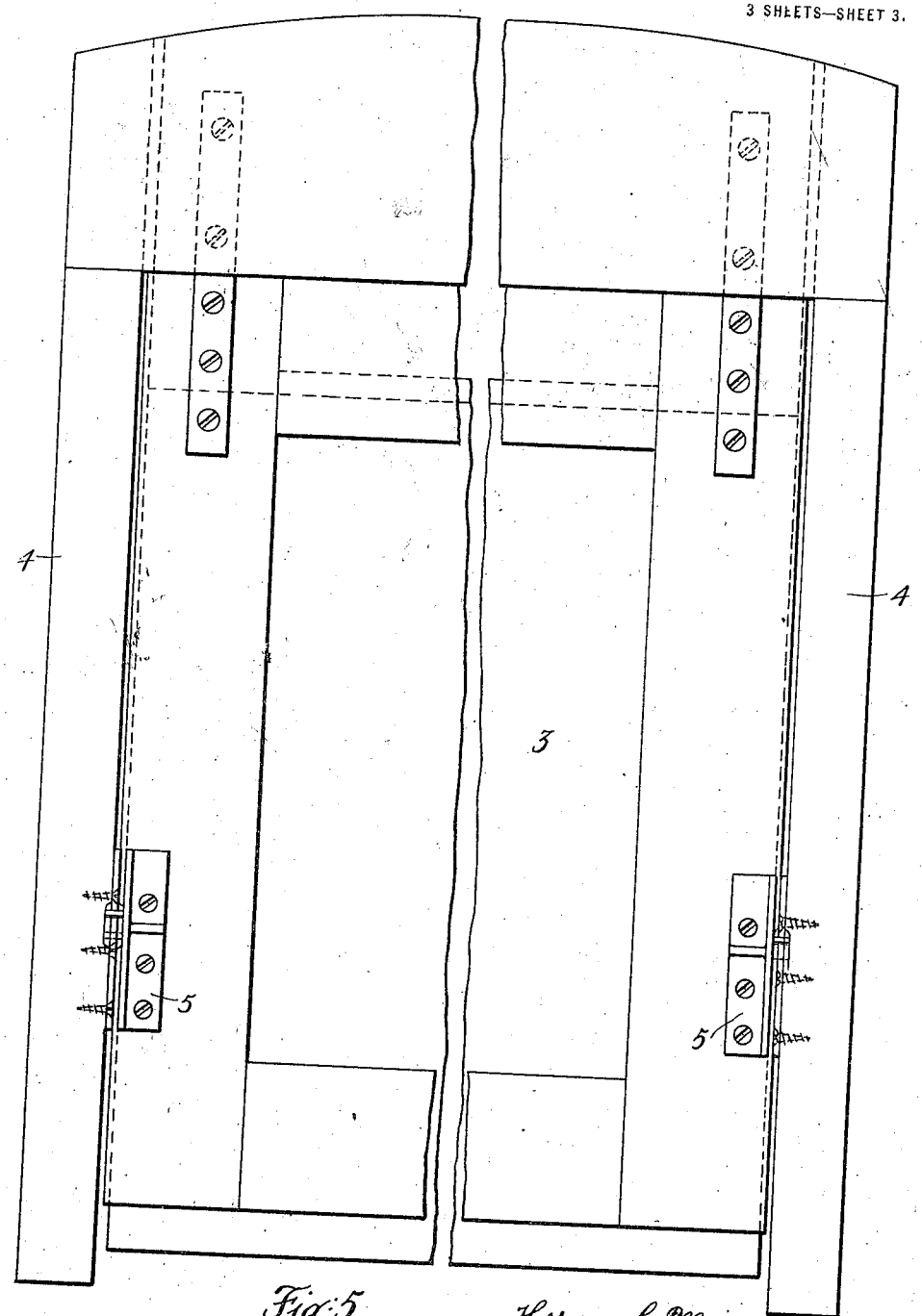

HERMAN C. MAISE, OF DETROIT, MICHIGAN, ASSIGNOR, BY MESNE ASSIGNMENTS, TO FINANCE & TRADING CORPORATION OF NEW YORK, A CORPORATION OF VIRGINIA.

AUTOMOBILE-BODY.

1,309,144.

Specification of Letters Patent. Patented July 8, 1919.

Application filed March 6, 1917. Serial No. 152,929.

*To all whom it may concern:*

Be it known that I, HERMAN C. MAISE, a citizen of the United States, and a resident of Detroit, county of Wayne, and State of Michigan, have invented certain new and useful Improvements in Automobile-Bodies, of which the following is a description.

My invention relates to automobile bodies, and particularly to those types of automobile bodies now well known as the Springfield type of convertible bodies.

The objects of my invention are to improve the appointments of such a type of body by providing a construction whereby the removable side windows, side members or other removable members of a similar character may be stored so as to be easily accessible to the occupants of the car. A further object is to so arrange the storing compartment that it can be reached by the passengers in the car without leaving the body and so that it will not interfere with the space in the body capable of use by the passengers.

With these objects in view, I locate the storage compartment behind the rear seat, and arrange the back member of the seat so that it can be moved so as to expose the compartment for the purpose of inserting or withdrawing the sections. With this arrangement the windows can be removed or inserted in the compartment without leaving the car, and with a minimum amount of trouble and inconvenience.

My invention comprises other improved features to which I will later refer. In the drawing forming a part of the specification, I have illustrated the preferred embodiment of my invention.

Referring to the drawings:

Figure 1 shows a side view of a portion of a convertible automobile body with my improved construction in its preferred form;

Fig. 2 shows a sectional top view of my device taken along the line A—A of Fig. 1;

Fig. 3 shows a sectional side view of my improved construction, the compartment empty and ready to receive the side windows;

Fig. 4 shows a sectional side view as in Fig. 3, but in its normal position;

Fig. 5 shows a rear view of the hinged back as in Fig. 6;

Fig. 6 shows a portion of a convertible automobile body equipped with a modified form of my construction;

Fig. 7 shows a sectional top view taken along the line B—B of Fig. 6;

Fig. 8 shows a sectional front view taken along the line C—C of Fig. 6;

Fig. 9 shows a front view of the bearing member of the hinge;

Fig. 10 shows a top view of the pin member of the hinge;

Fig. 11 shows a front view of the pin member as in Fig. 10.

Illustrated at 1 is a portion of a convertible automobile body having a seat cushion 2 and a cushioned back 3 hinged to an upright portion 4 of the body 1 by means of a hinge 5, the back having constructed thereon compartments 6 and 7 adapted to contain the side sections 8.

In the modified construction shown in Figs. 6, 7 and 8, the back 9 is hinged as in the construction above described, but the compartments 10 are built into the rear portion of the body and have their open ends disposed at the back of the seat. By swinging the seat forward, the windows or sections can readily be inserted or removed.

The hinge 5 shown in both constructions is preferably made so that the back can easily be removed to effect cleaning, etc. To this end the pin member 11 of the hinge is made rectangular so that on rotating the seat forward, a sufficient amount, the rectangular pin member 11 of the hinge is released through the opening 12 in the bearing member 13 thereof.

Using the preferred form of construction, the mode of operation is as follows: Assuming that the side members are in the operative position in the automobile body, and it is desired to convert the body into an open type, the windows are removed and the top of the cushioned back rotated sufficient to enable the side members to be inserted therein. This accomplished, the back is again rotated into its normal position, completing the operation.

If it is desired to again effect the closing of the body, the above operations are reversed.

The mode of operation using the illustrated modified form of construction is similar to the method of operation described above.

While I have shown and described two particular types of bodies for illustrative purposes, I wish it distinctly understood that my invention is applicable to numerous type of bodies in this general class. Also it will be apparent to those skilled in the art that further modification may be made without departing from the scope of my invention.

What I claim is:

1. A vehicle body of the kind described having removable body members, a seat, a compartment adapted to receive said removable members, a back to said seat upon which said compartment is mounted, said seat back being hingedly connected to a portion of said body and adapted to be rotated forwardly to enable the insertion of said members into said compartment, the said back when in its normal position being arranged to contact with the body and thereby effect the concealment of the compartment.

2. A vehicle body of the kind described having removable body members, a seat, a back to said seat having a compartment attached thereto and movable therewith, adapted to receive the removable members, the said back being hingedly connected to the body, and adapted to be rotated forwardly to enable the insertion of said members into said compartments.

3. In a vehicle having removable body members, a seat, a seat back hinged to said body, a storage compartment mounted upon said seat back having substantially vertical guides to engage the removable body members, and said seat back and the attached compartment being rotatable forwardly about said hinge to permit the insertion of said removable members in the storage compartment between said vertical guides and thereafter rotatable rearwardly to close said compartment and retain said removable members therein.

HERMAN C. MAISE.